United States Patent
Bale et al.

(10) Patent No.: US 7,705,319 B2
(45) Date of Patent: Apr. 27, 2010

(54) CDZNTE DEVICE USING CONSTRAINED DESIGN FOR HIGH-FLUX X-RAY SPECTROSCOPIC IMAGING APPLICATIONS

(75) Inventors: Derek S. Bale, Gibsonia, PA (US); Stephen A. Soldner, Butler, PA (US); Csaba Szeles, Allison Park, PA (US)

(73) Assignee: Endicott Interconnect Technologies, Inc., Endicott, NY (US)

( * ) Notice: Subject to any disclaimer, the term of this patent is extended or adjusted under 35 U.S.C. 154(b) by 2 days.

(21) Appl. No.: 12/204,929

(22) Filed: Sep. 5, 2008

(65) Prior Publication Data

US 2009/0065701 A1    Mar. 12, 2009

Related U.S. Application Data

(60) Provisional application No. 60/967,668, filed on Sep. 6, 2007.

(51) Int. Cl.
*H01L 27/146* (2006.01)
*G01J 5/20* (2006.01)

(52) U.S. Cl. ............................... 250/370.13; 250/338.4

(58) Field of Classification Search ............. 250/338.4, 250/370.13
See application file for complete search history.

(56) References Cited

U.S. PATENT DOCUMENTS

2008/0240339 A1* 10/2008 Du et al. ................... 378/5

OTHER PUBLICATIONS

D.S. Bale et al.: "Nature of polarization in wide-bandgap semiconductor detectors under high-flux irradiation: Application to semi-insulating Cd(1-x)Zn(x)Te", Phys. Rev. B77, pp. 035205-1-035205-16 (2008).

D.S. Bale et al.: "Multiple-Scale Analysis of Charge Transport in Semiconductor Radiation Detectors: Application to Semi-Insulating CdZnTe", J. Electron. Mater. 38, pp. 126-144 (2009).

C. Szeles et al.: "Trapping properties of cadmium vacancies in Cd(1-x)Zn(x)Te", Phys. Rev., vol. 55, No. 11, pp. 6945-6949 (1997).

C. Szeles et al.: "Ultra High Flux 2-D CdZnTe Monolithic Detector Arrays for X-Ray Imaging Applications", IEEE Trans. Nucl. Sci., vol. 54, No. 4, pp. 1350-1358 (2007).

C. Szeles et al.: "CdZnTe Semiconductor Detectors for Spectroscopic X-ray Imaging", IEEE Trans. Nucl. Sci., vol. 55, No. 1, pp. 572-582 (2008).

* cited by examiner

*Primary Examiner*—David P Porta
*Assistant Examiner*—Mark R Gaworecki
(74) *Attorney, Agent, or Firm*—Mark Levy; Hinman, Howard & Kattell

(57) ABSTRACT

A CdZnTe photon counting detector includes a core material of $Cd_{1-x}Zn_xTe$, where ($0 \leq x < 1$), an anode terminal on one side of the core material and a cathode terminal on a side of the core material opposite the anode terminal. At least one of the following is selected in the design of the detector as a function of the maximum sustainable photon flux the core material is able to absorb in operation while avoiding polarization of the core material: electron lifetime-mobility product of the core material; de-trapping time of the core material; a value of a DC bias voltage applied between the anode and the cathode; a temperature of the core material in operation; a mean photon flux density to be absorbed by the core material in operation; and a thickness of the core material between the anode and the cathode.

11 Claims, 11 Drawing Sheets

CDZNTE DEVICE USING CONSTRAINED DESIGN FOR HIGH-FLUX X-RAY SPECTROSCOPIC IMAGING APPLICATIONS

CROSS REFERENCE TO RELATED APPLICATION

This application claims benefit of U.S. Provisional Application No. 60/967,668, entitled "CdZnTe Device Using Constrained Design For High-Flux X-Ray Spectroscopic Imaging Applications", filed Sep. 6, 2007, which is hereby incorporated by reference in its entirety.

GOVERNMENT LICENSE RIGHTS

The U.S. Government has a paid-up license in this invention and the right in limited circumstances to require the patent owner to license others on reasonable terms as provided for by the terms of contract DAAE 30 03 C 1171 awarded by U.S. Army Armament Research, Development, and Engineering Center (ARDEC).

BACKGROUND OF THE INVENTION

There is a growing interest in the potential of pulse mode CdZnTe crystalline detectors for high-flux high-speed energy selective or hyper-spectral x-ray imaging. The energy sensitivity provided by the $Cd_{1-x}Zn_xTe$, where ($0 \leq x < 1$), material forming these detectors opens up a range of new potential applications for this detector technology in medical, industrial, security imaging and tomography. In fact, such energy sensitivity can potentially revolutionize these fields. However, imaging applications typically require photon flux fields that generate very high count rates within the CdZnTe detector. For example, medical Computed Tomography applications represent a large potential market for this technology, but require CdZnTe detectors capable of handling count rates from 20 to 2000 million counts per second per square millimeter (counts/s/mm$^2$).

One of the challenges in applying pulse mode CdZnTe detectors to applications requiring such high count rates is avoiding a build up of "space charge" within the CdZnTe crystal structure that collapses the electric field and results in a reversible count paralyzation failure (i.e., polarization). Therefore, these CdZnTe detectors must be designed such that charge generated by photon flux, e.g., x-ray radiation, in the CdZnTe crystal structure thereof is dissipated at a sufficiently high rate, through both drift and recombination, to avoid polarization. Proper selection of both the quality of the CdZnTe material forming such detector and the CdZnTe detector's design parameters are paramount to achieving high charge throughput for such detectors while avoiding polarization.

SUMMARY OF THE INVENTION

The invention is a CdZnTe photon counting detector. The detector includes a core material of $Cd_{1-x}Zn_xTe$, where ($0 \leq x < 1$); an anode terminal on one side of the core material; and a cathode terminal on a side of the core material opposite the anode terminal. At least one of the following is selected in the design of the detector as a function of the maximum sustainable photon flux the core material is able to absorb in operation while avoiding polarization of the core material: hole lifetime-mobility product of the core material; hole de-trapping time of the core material; a value of a DC bias voltage applied between the anode and the cathode; a temperature of the core material in operation; a mean photon energy to be absorbed by the core material in operation; and a thickness of the core material between the anode and the cathode. The anode terminal, the cathode terminal or both can include a plurality of segmented terminals.

The detector can be designed according to the following equation:

$$\Phi_\gamma^* = \frac{\varepsilon_{czt}\varepsilon_0 V^2}{qL\bar{E}_\gamma \lambda^2}\left[\beta - \frac{L}{\lambda}\exp\left(-\frac{L}{\lambda}\right)\right]^{-1} \frac{\mu_h \tau_h}{\tau_h + \tau_D};$$

where $\Phi_\gamma^*$ is the maximum sustainable photon flux per unit area while avoiding polarization of the core material; $\varepsilon_{czt}$ is the pair-creation energy in $Cd_{1-x}Zn_xTe$, where ($0 \leq x < 1$); $\varepsilon_0$ is the electrical permittivity of free space; V is the bias voltage applied to the anode and cathode terminals; q=1.6E-19 Coulombs; L is the detector thickness; $\bar{E}_\gamma$=mean photon energy; $\lambda$ is the photon absorption length scale defined by the linear photon absorption coefficient for $Cd_{1-x}Zn_xTe$, where ($0 \leq x < 1$); $\beta=1-\exp(-L/\lambda)$; $\mu_h$ is the hole mobility; $\tau_h$ is the trapping time for holes; and $\tau_D$ is the temperature-dependent de-trapping time for holes $\tau_D \sim \exp(E_A/kT)$.

The invention is also a CdZnTe photon counting detector design method. The method includes (a) selecting a core material of $Cd_{1-x}Zn_xTe$, where ($0 \leq x < 1$); (b) forming an anode terminal on one side of the core material; (c) forming a cathode terminal on a side of the core material opposite the anode terminal; and (d) selecting at least one of the following as a function of the maximum sustainable photon flux the core material is able to absorb in operation while avoiding polarization of the core material: hole lifetime-mobility product of the core material; hole de-trapping time of the core material; a value of a DC bias voltage applied between the anode and the cathode; a temperature of the core material in operation; a mean photon energy to be absorbed by the core material in operation; and a thickness of the core material between the anode and the cathode. The anode terminal, the cathode terminal or both can include a plurality of segmented terminals.

Step (d) can include utilizing the following equation to make the selection:

$$\Phi_\gamma^* = \frac{\varepsilon_{czt}\varepsilon_0 V^2}{qL\bar{E}_\gamma \lambda^2}\left[\beta - \frac{L}{\lambda}\exp\left(-\frac{L}{\lambda}\right)\right]^{-1} \frac{\mu_h \tau_h}{\tau_h + \tau_D};$$

where $\Phi_\gamma^*$ is the maximum sustainable photon flux per unit area while avoiding polarization of the core material; $\varepsilon_{czt}$ is the pair-creation energy in $Cd_{1-x}Zn_xTe$, where ($0 \leq x < 1$); $\varepsilon_0$ is the electrical permittivity of free space; V is the bias voltage applied to the anode and cathode terminals; q=1.6E-19 Coulombs; L is the detector thickness; $\bar{E}_\gamma$=mean photon energy; $\lambda$ is the photon absorption length scale defined by the linear photon absorption coefficient for $Cd_{1-x}Zn_xTe$, where ($0 \leq x < 1$); $\beta=1-\exp(-L/\lambda)$; $\mu_h$ is the hole mobility; $\tau_h$ is the trapping time for holes; and $\tau_D$ is the temperature-dependent de-trapping time for holes $\tau_D \sim \exp(E_A/kT)$.

Lastly, the invention is a CdZnTe photon counting detector that comprises a core material of $Cd_{1-x}Zn_xTe$, where ($0 \leq x < 1$); an anode terminal on one side of the core material; and a cathode terminal on a side of the core material opposite the anode terminal, wherein the detector can output more than 20 million counts/s/mm$^2$, and more desirably more than 30 million counts/s/mm$^2$, and even more desirably more than 50 million counts/s/mm². The anode terminal, the cathode terminal or both can include a plurality of segmented terminals.

DETAILED DESCRIPTION OF THE INVENTION

The present invention will be described with reference to the accompanying figures where like reference numbers correspond to like elements.

Figure 1:
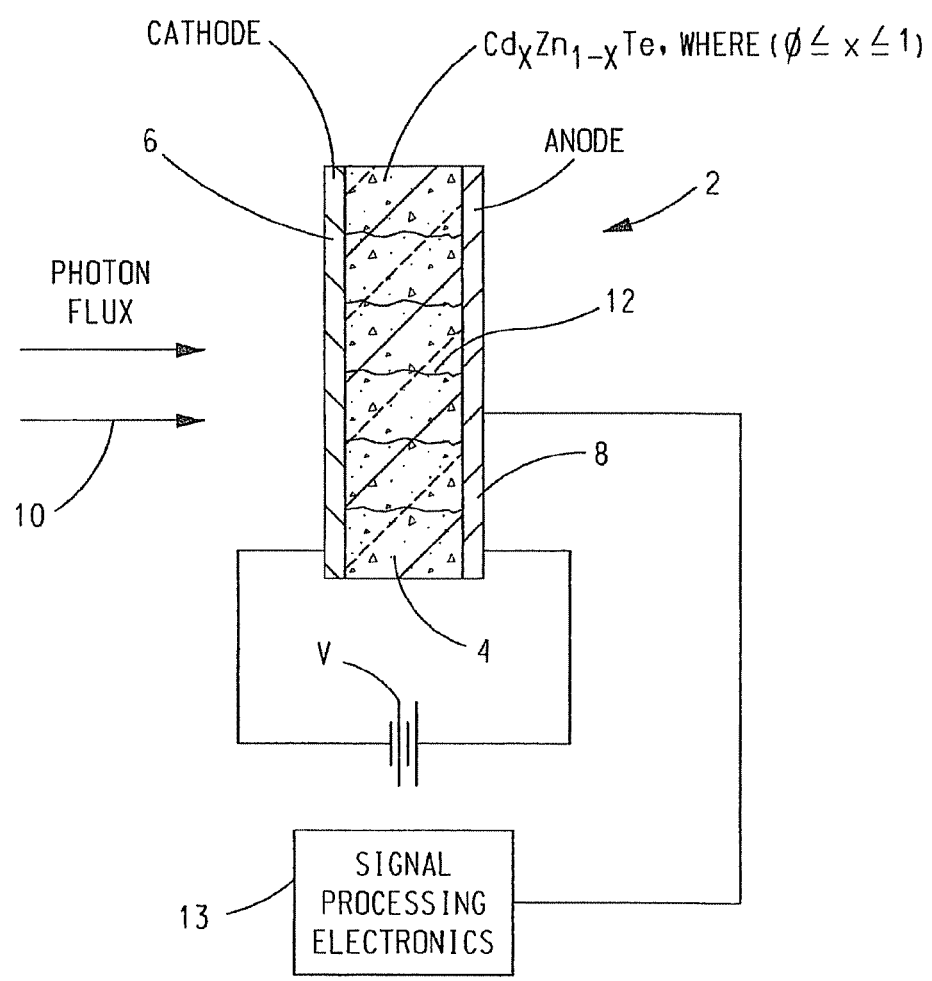
FIG. 1 is a cross-sectional schematic view of a single crystal detector coupled to a DC bias circuit and signal processing electronics which are operative for converting incoming photon flux into count values related to the density of the incoming photon flux.

With reference to FIG. 1, a CdZnTe single crystal detector 2 includes a core material 4 of $Cd_{1-x}Zn_xTe$, where ($0 \leq x < 1$), sandwiched between a conducting cathode terminal 6 and a conducting anode terminal 8. Cathode 6 can be continuous or pixilated. Similarly, anode 8 can be continuous or pixilated. Cathode 6 and anode 8 are biased by a DC voltage V in a manner known in the art whereupon an electric field 12 is produced between cathode 6 and anode 8 in core material 4. In response to interaction between core material 4 and photon flux 10 (e.g., without limitation, x-ray radiation) entering core material 4 via cathode 6, electron-hole pairs are generated in core material 4. Electric field 12 attracts electrons generated in core material 4 to anode 8 for detection and processing by suitable signal processing electronics 13, which converts the electrons attracted to anode 8 into a number of counts related to the density of photon flux 10 impinging on CdZnTe crystalline detector 2 in a manner known in the art.

Figure 2:
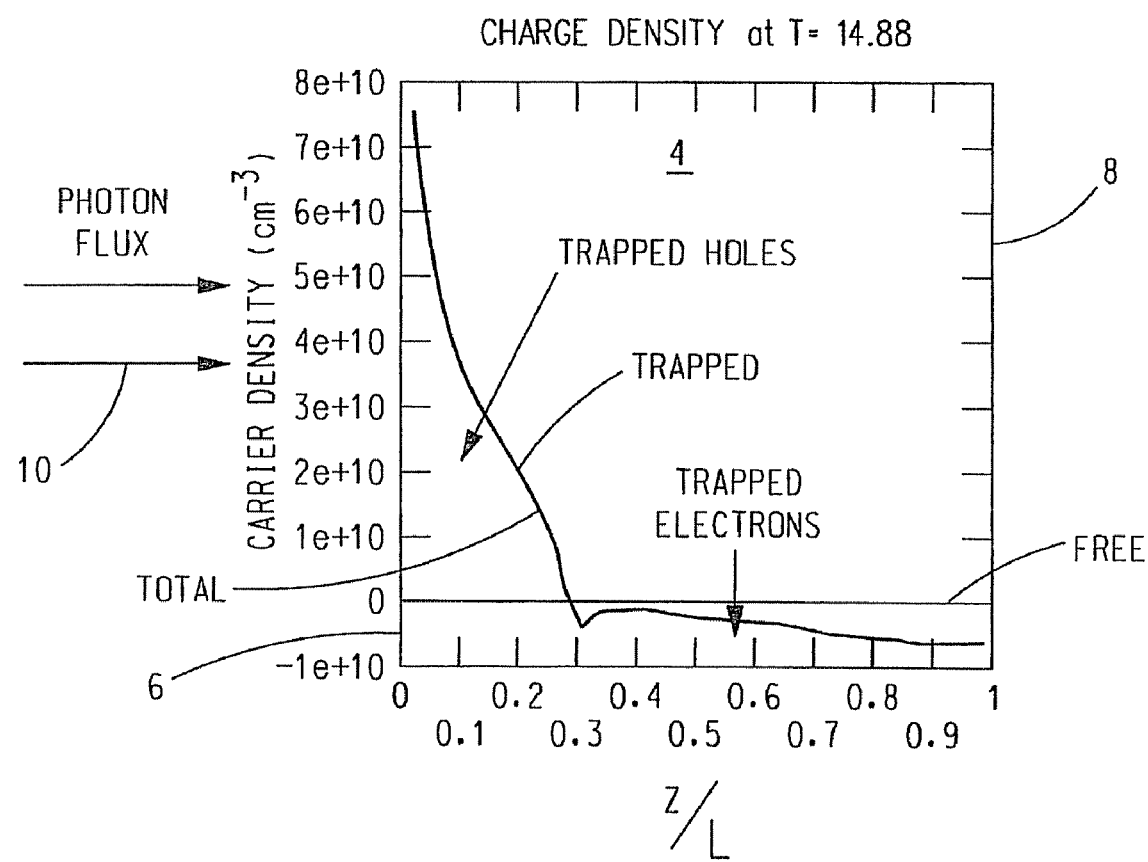
FIG. 2 is a plot of the charge density resulting from a high flux of x-rays versus normalized thickness of the core material of the single crystal detector of FIG. 1.

With reference to FIG. 2 and with continuing reference to FIG. 1, in use of CdZnTe crystalline detector 2, a large concentration of positive trapped charge (i.e., holes) develops in core material 4 near cathode 6 through which photon flux 10 enters CdZnTe crystalline detector 2. An example charge distribution due to the carrier (holes and electrons) concentration in CdZnTe crystalline detector 2 is shown in FIG. 2.

Figure 3:
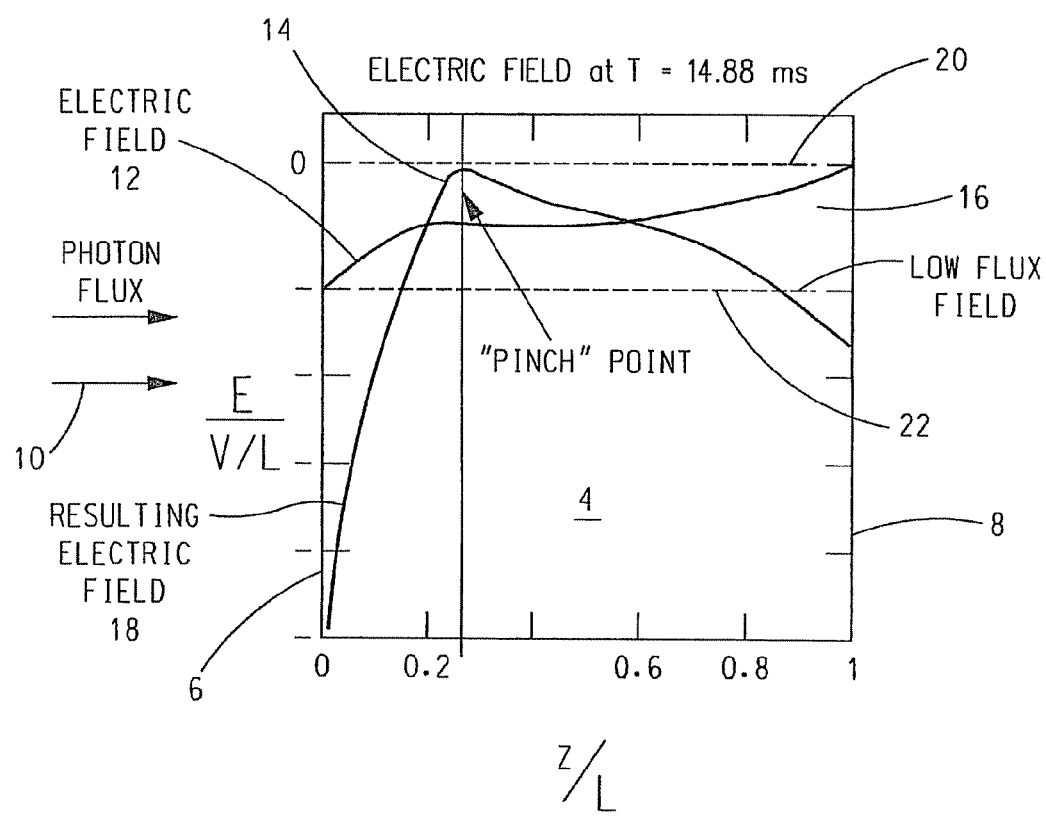
FIG. 3 shows plots of the nominal and resulting steady-state electric fields versus normalized thickness of the core material of the single crystal detector of FIG. 1, wherein the resulting electric field is the sum of a nominal electric field imposed across the core material of the single crystal detector of FIG. 1 via the voltage V and an electric field induced in the core material as a result of the charge density of FIG. 2 that builds in response to interactions of the incoming photon flux.

With reference to FIG. 3 and with continuing reference to FIGS. 1 and 2, this positive trapped charge coacts with electric field 12 to create in core material 4 a resulting electric field 18 having a "pinch" point 14 where the value of resulting electric field 18 is near zero. An example of the spatial dependence of resulting electric field 18 in CdZnTe crystalline detector 2 in response to interaction between photon flux 10, core material 4 and electric field 12 is shown in FIG. 3. Electrons (or electron charge clouds) generated on the cathode 6 side of pinch point 14 in core material 4 must travel through a so-called "low-field region" 16 between pinch point 14 and anode 8, and, therefore, have dramatically increased transit times. In FIG. 3, low-field region 16 is bounded by a dashed line 20, corresponding to a value of zero for resulting electric field 18, and a dashed line 22, corresponding to a predetermined Low Flux Field value of resulting electric field 18.

Figure 4:
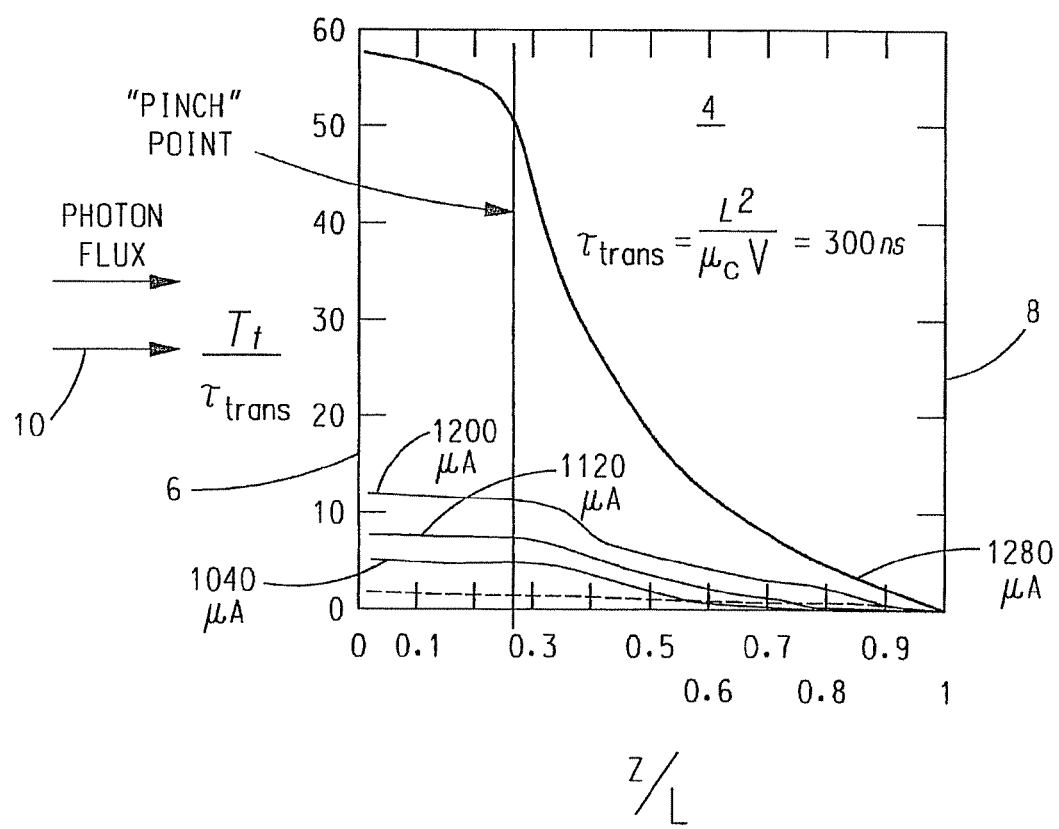
FIG. 4 shows plots of the electron time of flight versus normalized thickness of the core material of the single crystal detector of FIG. 1 for x-ray tube currents of 1040 μA, 1120 μA, 1200 μA, and 1280 μA.

With reference to FIG. 4 and with continuing reference to FIGS. 1-3, the transit times for electrons in core material 4 are shown in FIG. 4 as a function of four values of the steady-state photon flux (e.g., without limitation, x-ray radiation), expressed in terms of x-ray tube current. FIG. 4 shows that as photon flux 10 increases, transit time dramatically increases for electrons generated between pinch point 14 and cathode 6.

Figure 5:
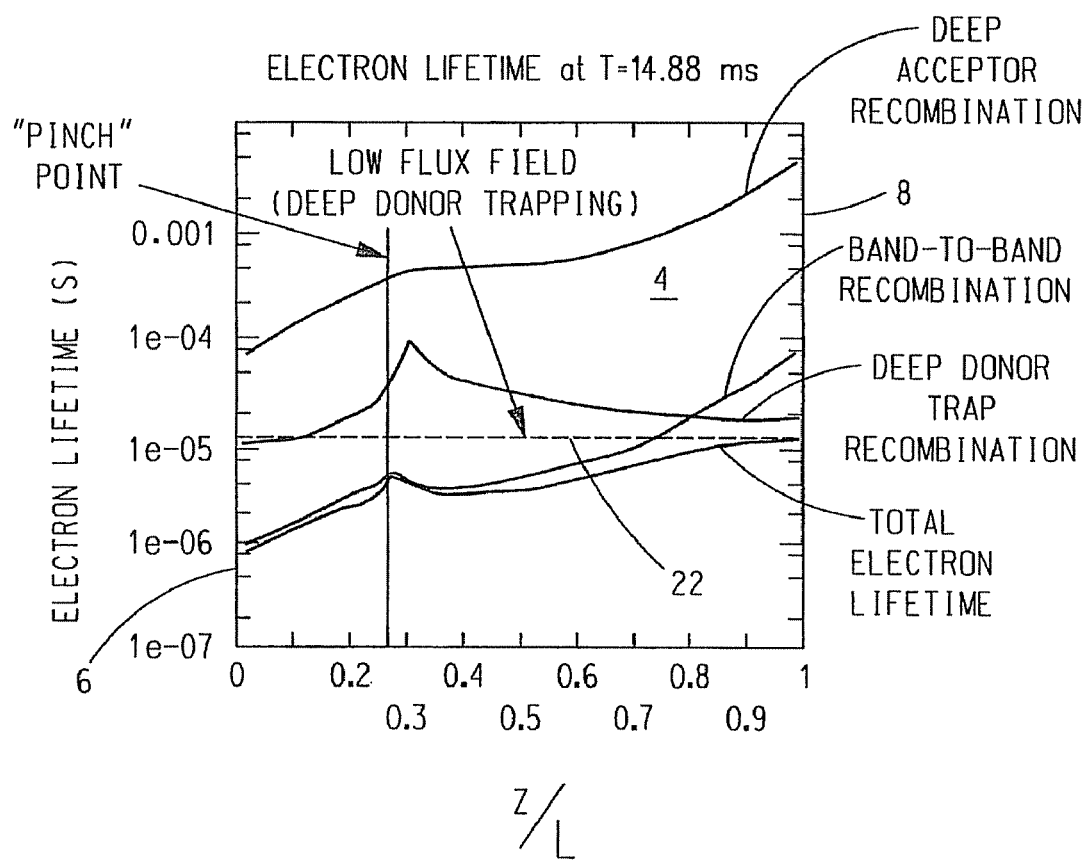
FIG. 5 shows plots of the total electron lifetime and its constituents resulting from recombination at a deep acceptor, direct band-to-band transitions, and trapping at the deep donor versus normalized thickness of the core material of the single crystal detector of FIG. 1.

With reference to FIG. 5 and with continuing reference to FIGS. 1-4, at the same time the electron transit time increases in response to increased photon flux 10, the large concentration of both free and trapped charges (holes and electrons) increases the band-to-band recombination and the deep acceptor recombination. These increases, in turn, decrease the total lifetime of electrons in the vicinity of cathode 6, as shown in FIG. 5 where the total electron lifetime is shown limited by band-to-band recombination. In fact, as shown in FIG. 5, the total electron lifetime near cathode 6 is about an order of magnitude less than the total electron lifetime near anode 8. In FIG. 5, the "Total Electron Lifetime" is the sum of the inverse of each of the "Deep Acceptor Recombination Rate" (DARR), the "Band-to-Band Recombination Rate" (BBRR), and the "Deep Donor Recombination Rate" (DDRR), i.e., Total Electron Lifetime=1/DARR+DBRR+DDRR.

Figure 6:
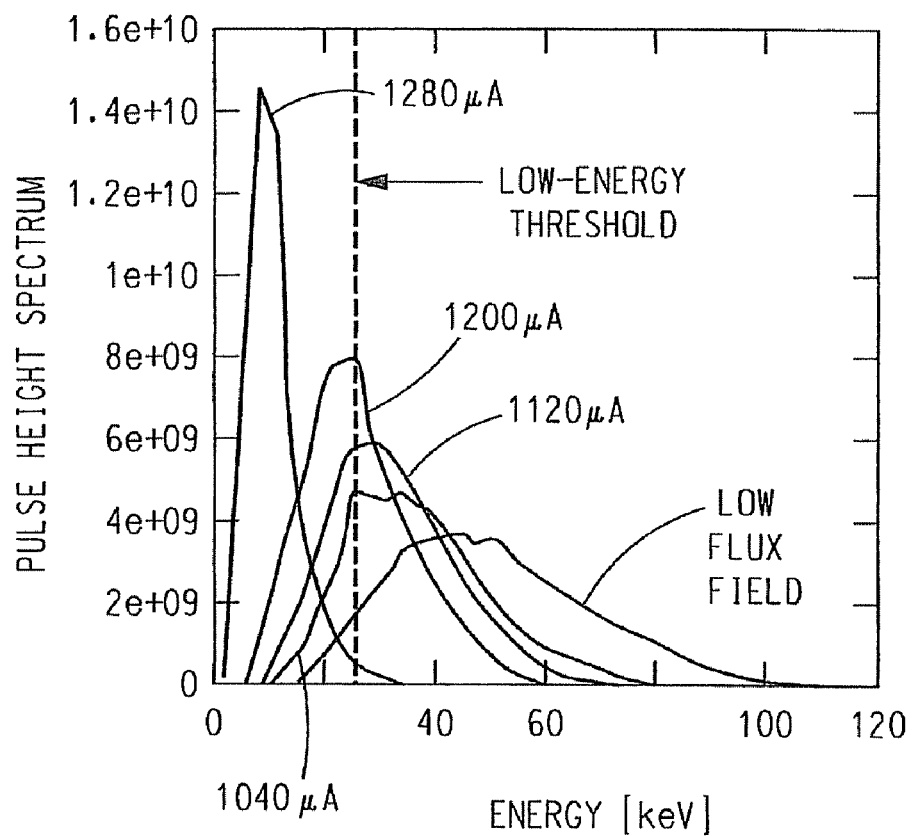
FIG. 6 shows plots of the pulse height spectra versus incident x-ray photon energy for x-ray tube currents of 1040 μA, 1120 μA, 1200 μA, and 1280 μA and a plot of the pulse height spectrum versus incident x-ray photon energy for a predetermined value of Low Flux Field (Low-Energy Threshold)

With reference to FIG. 6 and with continuing reference to FIGS. 1-5, longer transit times and a reduced lifetime for electrons reduce the charge collection efficiency. This results in reduced signal amplitude and a reduced number of counts being recorded at lower energies. Therefore, as the photon flux increases, the entire count spectrum shifts to the left as shown in FIG. 6. FIG. 6 shows that as the flux increases, a larger fraction of the spectrum, and therefore counts, lies below a typical low-energy counting threshold. At a high enough photon flux, all counts fall below the low-energy threshold as shown by the 1280 μA curve in FIG. 6.

Figure 7:
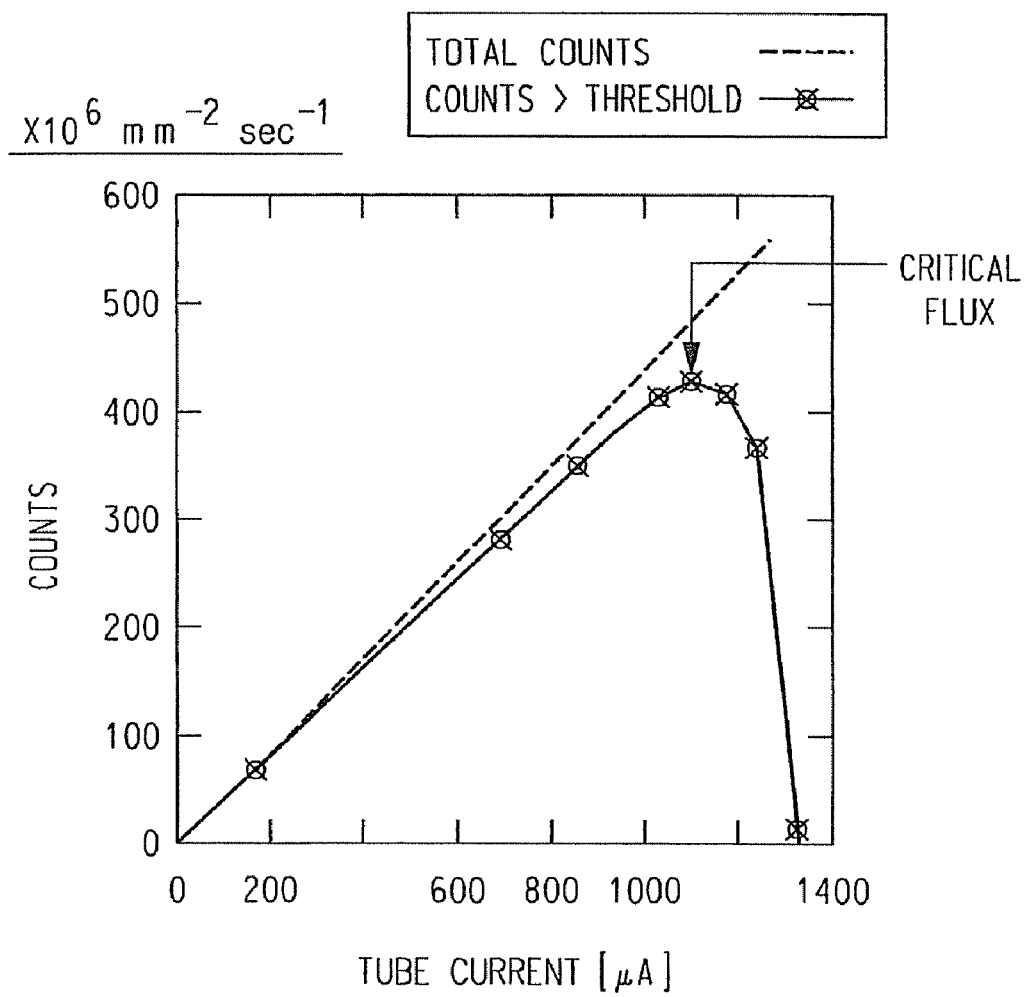
FIG. 7 shows a plot of the integrated counts above the low-energy threshold as a function of x-ray current (photon flux)

With reference to FIG. 7 and with continuing reference to FIGS. 1-6, finally, the result of a shifting spectrum is that the number of counts output by CdZnTe crystalline detector 2 begins to decrease as well. FIG. 7 shows the integrated counts above the low-energy threshold as a function of x-ray photon flux (tube current).

The foregoing shows that it is the dynamics of slow-moving holes through the CdZnTe crystalline detector 2 that begins the sequence of polarization at high flux. Further, the collapse of the electric field at the pinch point contributes to the final stages of device failure.

Based on the foregoing, the present inventors have determined the following Equation 5 for the maximum sustainable flux (i.e., critical flux) as a function of both material and detector parameters. Details regarding the derivation of Equation 5 will be described next.

The determination of the fundamental relationship between a critical flux and both material and detector design parameters can be summarized as follows:

1. Calculate the amount of charge necessary to collapse the electric field at a pinch point, denoted here by $Q^*$
2. Calculate the time dependence, $Q(T)$, of the build up of positive charge density within the detector.
3. Polarization results when the time-asymptotic limit of the build up of positive charge from step 2 exceeds that necessary to collapse the electric field from step 1. Mathematically, this is expressed as $\lim_{T \to \infty} Q(T) = Q^*$.

Neglecting trapped electrons and assuming an exponentially distributed concentration of trapped holes (e.g., see FIG. 2), it can be shown that the necessary concentration of holes at the cathode can be expressed as:

$$Q^* = A \frac{\varepsilon_0 V}{\lambda}, \quad \text{Equation 1}$$

where A is the surface area illuminated by the photon flux, e.g., without limitation, x-ray radiation;

$\varepsilon_0$ is the electrical permittivity of free space;

V is the bias voltage; and $\lambda$ is the photon absorption length scale defined by the linear photon absorption coefficient for $Cd_{1-x}Zn_xTe$, where ($0 \leq x < 1$).

Equation 1 approximates the necessary amount of trapped charge to eliminate the electric field strength due to the external bias voltage at the pinch point.

Now that the minimum charge needed to collapse the field and develop the pinch point is known, the following perturbation solution (Equation 2) can be utilized to find the time dependence of the total charge resulting from both free and trapped holes in the detector:

$$Q(T) = q A \Phi_\gamma \left( \frac{\overline{E}_\gamma \lambda}{\varepsilon_{czt} v_{eff}} \right) \quad \text{Equation 2}$$

-continued $$\begin{cases} 1 - \exp\left(-\frac{v_{eff}}{\lambda} T\right) - \frac{v_{eff}}{\lambda} T \exp\left(-\frac{L}{\lambda}\right) & T < L/v_{eff} \\ 1 - \left(1 + \frac{L}{\lambda}\right) \exp\left(-\frac{L}{\lambda}\right) & T \geq L/v_{eff} \end{cases}$$

where $Q(T)$ is the time dependent build up of positive charge density within the detector;

q=1.6E-19 Coulombs;

A is the surface area illuminated by the x-rays;

$\Phi_\gamma$ is the photon flux;

$\overline{E}_\gamma$ = mean photon energy;

$\lambda$ is the photon absorption length scale defined by the linear photon absorption coefficient for $Cd_{1-x}Zn_xTe$, where ($0 \leq x < 1$);

$\varepsilon_{czt}$ is the pair-creation energy in $Cd_{1-x}Zn_xTe$, where ($0 \leq x < 1$);

$v_{eff}$ (See Equation 3 below);

L is the detector thickness; and

T is time.

The expression for $Q(T)$ in Equation 2 includes the reduced effective speed of the holes that has the functional form:

$$v_{eff} = \frac{\tau_h}{\tau_h + \tau_D} \mu_h E, \quad \text{Equation 3}$$

where $\tau_h$ is the trapping time for holes;

$\tau_D$ is the temperature-dependent de-trapping time for holes $\tau_D \sim \exp(E_A/kT)$;

$E_A$ is the mid-gap ionization energy of a hole trap;

T is time;

k is Boltzmann constant;

$\mu_h$ is the hole mobility;

E=V/L;

V is the voltage applied between the cathode 6 and the anode 8; and

L is the detector thickness.

The reduced effective speed of the holes, i.e., $v_{eff}$ is a result of the stop and go process that results from multiple cycles of trapping and de-trapping during transit.

The de-trapping time for holes, i.e., $\tau_D$, also depends on $E_A$ which is the mid-gap ionization energy of a hole trap. It is well known in the literature that there is a native deep-level hole trap in $Cd_{1-x}Zn_xTe$, where ($0 \leq x < 1$).

The maximum sustainable flux, denoted in the following Equation 4 by $\Phi_\gamma^*$, can now be represented by balancing the time asymptotic value of this concentration of holes with the minimum concentration necessary for creating the pinch point:

$$\lim_{T \to \infty} Q(T) = \Phi_\gamma^* \left( \frac{q \overline{E}_\gamma \lambda}{\varepsilon_{czt} v_{eff}} \right) \left( \beta - \frac{L}{\lambda} \exp\left(-\frac{L}{\lambda}\right) \right) = \frac{\varepsilon_0 V}{\lambda}, \quad \text{Equation 4}$$

where $\beta = 1 - \exp(-L/\lambda)$.

Finally, solving for $\Phi_\gamma^*$ yields the following Equation 5:

$$\Phi_\gamma^* = \frac{\varepsilon_{czt}\varepsilon_0 V^2}{qL\overline{E}_\gamma \lambda^2}\left[\beta - \frac{L}{\lambda}\exp\left(-\frac{L}{\lambda}\right)\right]^{-1}\frac{\mu_h \tau_h}{\tau_h + \tau_D}, \quad \text{Equation 5}$$

relating the maximum sustainable photon flux the CdZnTe detector is able to absorb while avoiding polarization to design parameters of the CdZnTe detector, such as the material mobility-lifetime product for holes, operating temperature through the de-trapping time for holes, photon energy through $\lambda$, operating bias voltage and detector thickness. Equation 5 represents a design tool for $Cd_{1-x}Zn_xTe$ detectors, where ($0 \leq x < 1$), applied to high-flux applications.

Performance of $Cd_{1-x}Zn_xTe$ detectors, where ($0 \leq x < 1$), with an electron mobility-lifetime product ($\mu_e\tau_e$) (where $\mu_e$ is the electron mobility and $\tau_e$ is the electron lifetime) in the $1.0\times10^{-3}$ cm$^2$/V to $9.0\times10^{-3}$ cm$^2$/V range and with a hole mobility-lifetime product $\mu_h\tau_h$ (where $\mu_h$ is the hole mobility and $\tau_h$ is the hole lifetime) in the $1.5\times10^{-5}$ cm$^2$/V to $7.0\times10^{-5}$ cm$^2$/V range were evaluated. This evaluation revealed the dominant role of hole transport properties as predicted by Equation 5 to avoid catastrophic device polarization and achieve sufficiently high detector count-rate. Specifically, it was found that CdZnTe crystals with a $1.5\times10^{-5}$ cm$^2$/V hole mobility-lifetime product showed strong polarization at lower photon flux whereas CdZnTe with a $7.0\times10^{-5}$ cm$^2$/V hole mobility-lifetime product did not show polarization and had a count-rate capability of more than a 5 million counts/s/mm$^2$. The results of this evaluation are consistent with the dependence on the hole mobility-lifetime product derived in Equation 5.

Figure 8:
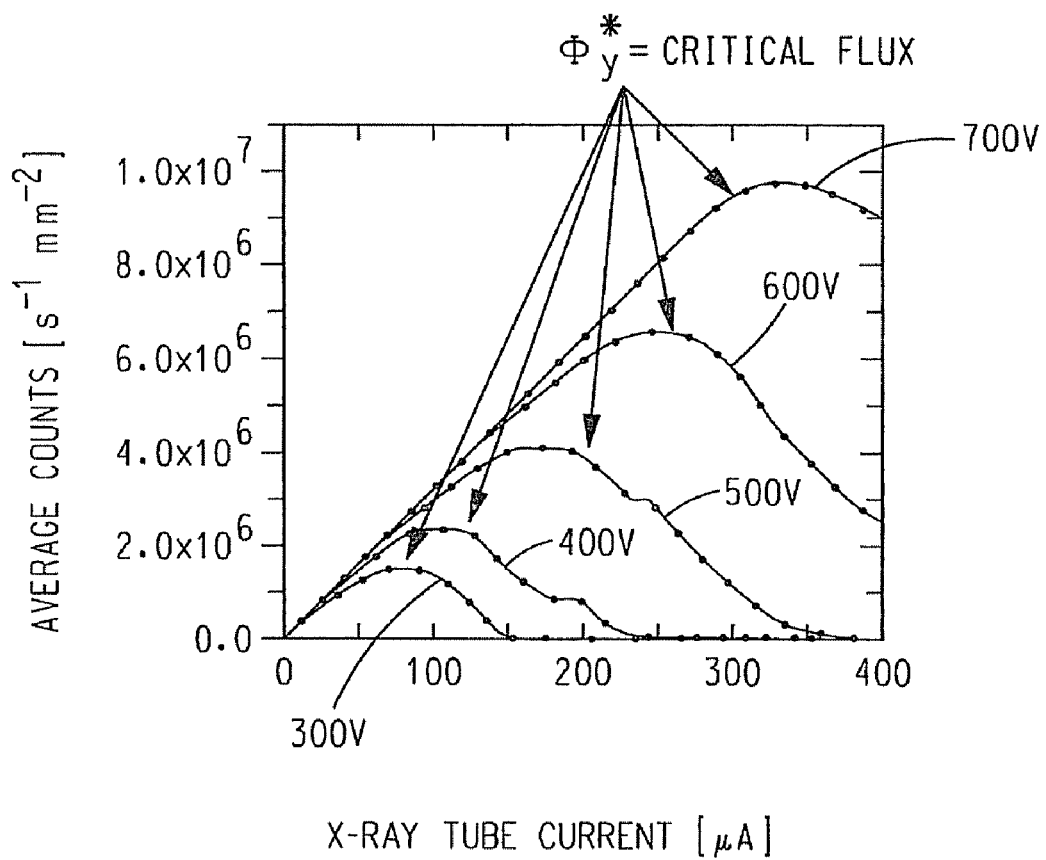
FIG. 8 shows plots of the measured average counts versus x-ray tube current (photon flux) for DC bias voltages of 300V, 400V, 500V, 600V, and 700V applied across the core material of the single crystal detector of FIG. 1.

With reference to FIG. 8 and with continued reference to FIGS. 1-7, the dependence of the maximum sustainable flux $\Phi_\gamma$ in Equation 5 on the operating bias voltage V of the device is quadratic (power law with power two). In order to verify this prediction, measurements were taken of the average counts from 256 pixels of a CdZnTe crystal detector known to polarize as x-ray tube current increases from 0 to 400 μA. Initially, the counts increased with increasing tube current as expected. As shown in FIG. 8, however, at the so-called "critical flux" ($\Phi_\gamma^*$ or $\Phi_{crit}$) the average number of counts output by the 256 pixels no longer increases with increasing tube current and, in fact, the average number of counts starts decreasing with further increasing tube current. This constitutes a direct measurement of the critical flux.

Figure 9:
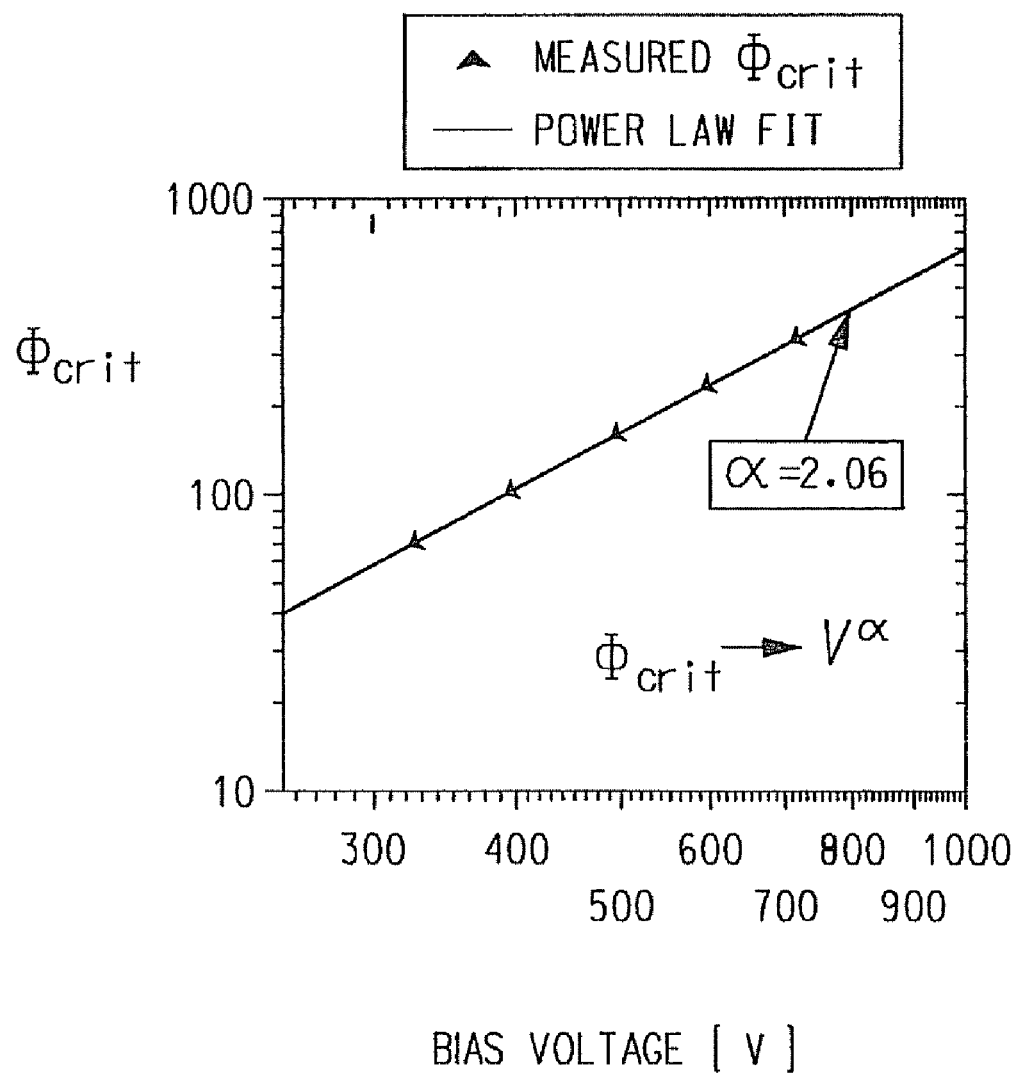
FIG. 9 is a plot of the maximum sustainable flux (i.e., critical flux) that can be processed by the core material of the single crystal detector of FIG. 1 versus DC voltage applied across the core material.

With reference to FIG. 9 and with continued reference to FIGS. 1-8, the bias voltage V applied to cathode 6 and anode 8 to produce electric field 12 was then increased, i.e., the strength of electric field 12 was increased, with all other design parameters held fixed. A plot of the measured values for the critical flux as a function of this bias voltage is shown in FIG. 9 on a log scale. The linearity of the data on the log scale is a clear indication that it follows a power law. Further, the slope of the line is measured to be 2.06, indicating that it is in fact a quadratic power law as predicted by Equation 5. That is, if the bias voltage V is doubled, the maximum sustainable flux $\Phi_\gamma$ increases by a factor of four.

Figure 10:
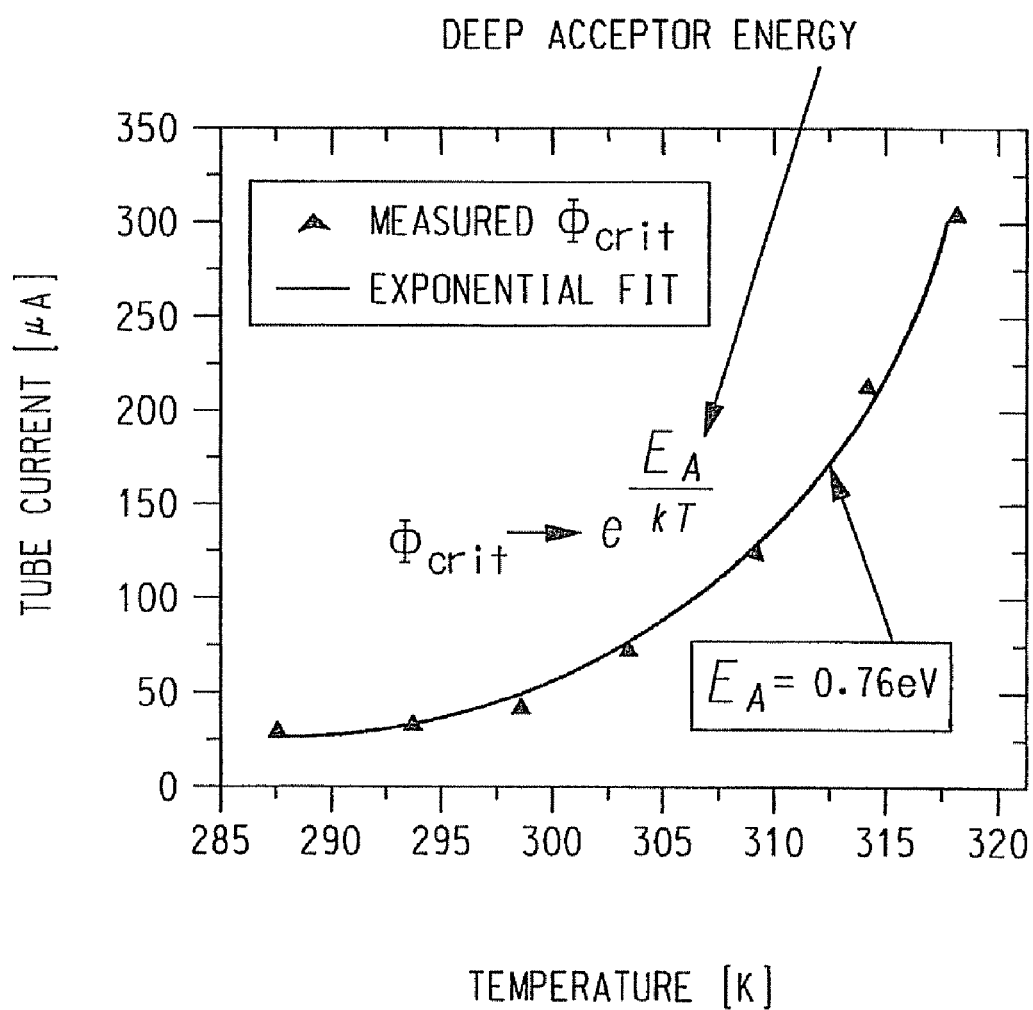
FIG. 10 is a plot of critical flux (in terms of tube current) versus temperature (K) for the core material of the single crystal detector of FIG. 1.
Figure 11:
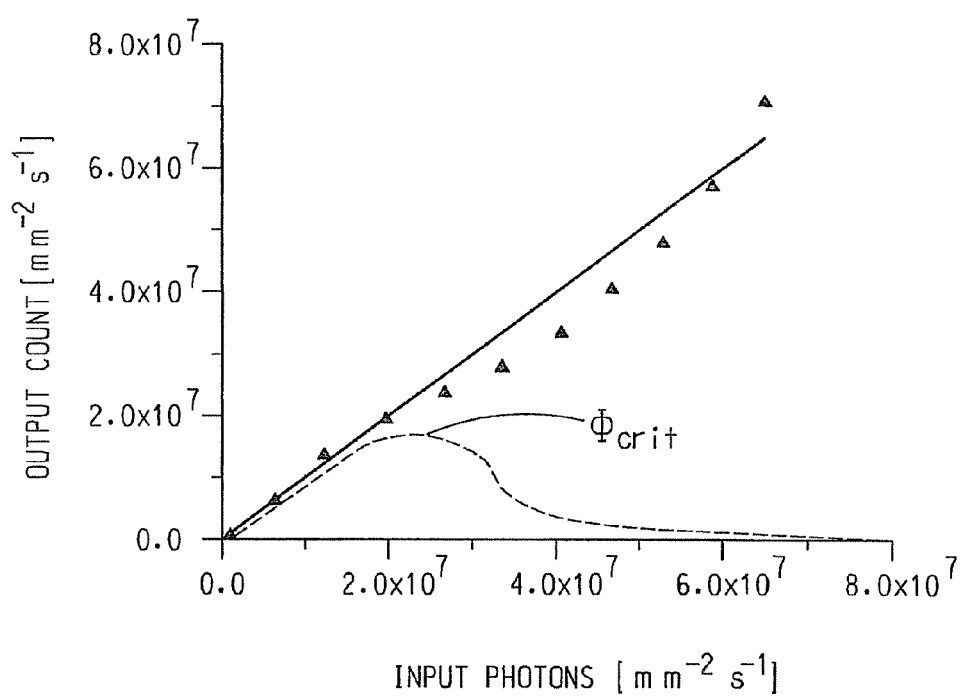
FIG. 11 is graph of Output Pulses versus Input Photons including a number of measured points (triangles) for a single crystal detector designed in accordance with the present invention, a continuous (solid) line showing a hypothetical plot of Output Pulses versus Input Photons for a single crystal detector designed in accordance with the present invention, and a dashed line showing a plot of Output Pulses versus Input Photons for a single crystal detector designed in accordance with the prior art.

With reference to FIG. 10 and with continued reference to FIGS. 1-9, the temperature dependence predicted by Equation 5 was experimentally validated. The temperature dependence comes from the fact that the de-trapping time of the holes, $\tau_D \sim \exp(E_A/kT)$, is governed by thermal excitation, where $E_A$ represents the energy level of the hole trap. Using this in Equation 5 implies that the temperature dependence of the critical flux is $\Phi_{crit} \sim \exp(-E_A/kT)$. This can be tested in the same way that the dependence on the bias voltage V was tested. Namely, the averaged counts detected by signal processing electronics 13 as the x-ray tube current is increased was determined and the current at which the counts stop increasing (e.g., the "critical flux") was located. This same measurement is then repeated at a higher temperature with all other parameters fixed. The resulting critical flux measurements as a function of temperature are shown in FIG. 10 as triangles. An exponential fit to these triangles is shown as a solid curve in FIG. 10. As can be seen, the fit is good and the calculated energy level is a mid-gap value.

In summary, a fundamental relationship between the maximum sustainable flux as a function of critical material and detector design parameters for CdZnTe crystal detectors applied to high-flux applications has been discovered. Experiments show that this relationship does, in fact, predict the critical flux above which polarization occurs and the device experiences catastrophic failure.

A CdZnTe-based detector can be designed according to Equation 5 that defines the necessary dependence of key material characteristics, detector design parameters and operating conditions that enable successful polarization-free operation under high x-ray flux conditions. Accordingly, Equation 5 provides a design tool for the matrix of parameter values that enable successful CdZnTe-based detector performance for any target of maximum x-ray flux and operating conditions. For example, one can achieve a four-fold increase in the maximum sustainable flux by simply doubling the bias voltage, or one could halve the detector thickness and at the same time double the hole mobility-lifetime product of the material selected for the application.

Although Equation 5 depends on a number of parameters, only a subset of these can be easily changed during a reasonable device design. For example, though Equation 5 depends on the pair creation energy in CdZnTe, $\varepsilon_{czt}$ (energy required to create an electron-hole pair), this is not considered an easily changed parameter and would, therefore, typically not be included in the set of "design parameters". Accordingly, Equation 5 can be viewed as a relationship between six fundamental device design parameters that include $\{\mu_h\tau_h, \tau_D, V, T, \overline{E}_\gamma, L\}$ with definitions of these symbols shown in the following Table 1.

TABLE 1

Parameters in Equation 5

| | parameter | symbol | units |
|---|---|---|---|
| Material | Hole lifetime-mobility product | $\mu_h\tau_h$ | cm$^2$/s |
| | Electron lifetime-mobility product | $\mu_e\tau_e$ | cm$^2$/s |
| | Hole resonance (de-trapping) time | $\tau_D$ | s |
| Operating | Bias voltage | V | V |
| | Temperature | T | K |
| | Mean photon energy | $\overline{E}_\gamma$ | keV |
| | | $\lambda$ | cm |
| Detector | thickness | L | cm |

Table 1 includes temperature as an operating design parameter. This is due to the fact that the de-trapping time for holes strongly depends on temperature as described above. Specifically, the de-trapping time is assumed to be of the form:

$$\tau_D = \frac{g}{\sigma\theta P}\exp\left(\frac{E_i}{kT}\right), \quad \text{Equation 6}$$

where g=4 represents the degeneracy of the hole trap;
$\sigma \sim 10^{-12}$ cm$^2$ is the trapping cross section;
$\theta=(kT/m_e)^{1/2}$ is the thermal velocity;
$E_1$ is the ionization energy of the hole trap; and
P is the number of available states in the valence band, which also depends on the temperature as shown in the following Equation 7:

$$P = 2\left(\frac{m_h^* kT}{2\pi\hbar^2}\right)^{3/2}.\qquad\text{Equation 7}$$

where $m_h^*$ is the reduced mass of holes in $Cd_{1-x}Zn_xTe$, where ($0 \leq x<1$).

Equations 1.6 and 1.7 depend on a number of fundamental constants whose symbols and numerical values are listed in the following Table 2.

TABLE 2

Physical constants used in evaluation of relationship
Fundamental Physical Constants

| | |
|---|---|
| $\epsilon_0$, permittivity of free space | 8.90E−14 C/cm/V |
| k, Boltzmann constant | 8.62E−05 eV/K |
| $m_e c^2$, electron rest mass energy | 5.11E+02 keV |
| $m_e$, electron rest mass | 5.69E−16 eV s$^2$/cm$^2$ |
| c, speed of light | 3.00E+10 cm/s |
| h, Plank's reduced constant | 6.58E−16 eV s |
| $\pi$ | 3.14E+00 |
| q, elementary charge magnitude | 1.60E−19 C |

Using these design parameters, together with Equation 5, an application dependent design of a suitable CdZnTe-based detector will now be described.

Suppose a CdZnTe detector is needed for an application that uses an x-ray tube with a mean energy of 60 keV and requires a critical flux up to 100 million photons/mm$^2$/s. Suppose further that a CdZnTe crystal having core materials 4 that is 3 mm thick operating with a 900V bias applied between the cathode 6 and anode 8 thereof at room temperature (T=296K) is selected. From Equation 5, it can be determined that if the CdZnTe core material 4 chosen for this CdZnTe detector has a hole mobility-lifetime product of $\mu_h\tau_h$ approximately equal to $3\times10^{-5}$ cm$^2$/V, the CdZnTe detector will have a critical flux of only 850,000 photons/mm$^2$/s—far from the desired critical flux of 100 million photons/mm$^2$/s. Indeed, Equation 5 reveals that a CdZnTe core material 4 having a hole-mobility lifetime product $\mu_h\tau_h$ approximately equal to $5\times10^{-3}$ cm$^2$/V would be needed. However, the highest hole-mobility lifetime product CdZnTe crystal has is $\mu_h\tau_h$ approximately equal to $10^{-4}$ cm$^2$/V, giving a critical flux of approximately 3 million photons/mm$^2$/s. Clearly, other design parameters must be considered.

Assume now that, although the ambient temperature is 296K, the CdZnTe detector can be warmed, (via, for example, an associated heating means) by 15K, to 311K, during operation. This elevated temperature increases the critical flux in Equation 5 (using hole mobility-lifetime product of $\mu_h\tau_h=10^{-4}$ cm$^2$/V) to approximately 12.5 million photons/mm$^2$/s—still far from the desired critical flux of 100 million photons/mm$^2$/s.

Assume further, that the bias voltage applied between the cathode 6 and anode 8 is doubled to 1800V (without deleterious effect on the CdZnTe crystal) and, at the same time, the thickness of the CdZnTe core material 4 is reduced to 2 mm. Under these conditions, Equation 5 gives a critical flux of 75 million photons/mm$^2$/s—still below the desired critical flux of 100 million photons/mm$^2$/s.

Finally, assume that the detector operating temperature is increased an additional +5 degrees, to 316K. From Equation 5, it can be determined that the CdZnTe crystal will have critical flux of 119 million photons/mm$^2$/s, above the desired flux rate of 100 M photons/mm$^2$/s.

As can be seen, a CdZnTe-based detector can be designed according to the fundamental constraints on design parameters defined in Equation 5. These dependencies are newly discovered and, therefore, provide a significant design tool that did not exist heretofore.

A CdZnTe-based detector was designed using Equation 5. The core material 4 of this CdZnTe-based detector had a thickness L=3 mm and was operated with V=1000 volts applied between cathode 6 and anode 8. The x-ray tube current was ramped from 0-500 μA and the number of counts output by the detector was recorded by signal

The invention claimed is:

1. A photon counting detector comprising:
   a core material of $Cd_{1-x}Zn_xTe$, where ($0 \leq x <1$);
   an anode terminal on one side of the core material; and
   a cathode terminal on a side of the core material opposite the anode terminal, wherein
   the anode terminal comprises either a single terminal or a plurality of segmented terminals; and
   the cathode terminal comprises a plurality of segmented terminals.

2. A method of designing a photon counting detector, comprising:
   (a) selecting a value for a design maximum sustainable photon flux that a core material of $Cd_{1-x}Zn_xTe$, where ($0 \leq x<1$), is able to absorb in operation while avoiding polarization of the core material;
   (b) selecting a plurality of design parameters as a function of the maximum sustainable photon flux, wherein the plurality of design parameters comprises:
      a hole lifetime-mobility product of the core material;
      a hole de-trapping time of the core material; and
      a thickness of the core material between an anode terminal and a cathode terminal;
   (c) selecting a plurality of operating parameters as a function of the maximum sustainable photon flux, wherein the plurality of operating parameters comprises:
      a value of a DC bias voltage applied between the anode terminal and the cathode terminal;
      a temperature of the core material in operation; and
      a mean photon energy to be absorbed by the core material in operation;
   (d) applying a correlation to determine a calculated maximum sustainable photon flux based on the pluralities of the design and operating parameters;
   (e) repeating steps (b)-(d) if the calculated maximum sustainable photon flux is not substantially equal to the design maximum sustainable photon flux;
   (f) selecting a core material of $Cd_{1-x}Zn_xTe$, where ($0 \leq x<1$), having the design parameters selected in step (b) and capable of operation at the operating parameters selected in step (c);
   (g) forming the anode terminal on one side of the core material; and
   (h) forming the cathode terminal on a side of the core material opposite the anode terminal.

3. The method of claim 2 wherein the design maximum sustainable photon flux is greater than 20 million counts/s/mm$^2$.

4. The method of claim 2 wherein said applying a correlation step (d) consists of:

$$\Phi_\gamma^* = \frac{\varepsilon_{czt}\varepsilon_0 V^2}{qL\overline{E}_\gamma \lambda^2}\left[\beta - \frac{L}{\lambda}\exp\left(-\frac{L}{\lambda}\right)\right]^{-1} \frac{\mu_h \tau_h}{\tau_h + \tau_D};$$

where $\Phi_\gamma^*$ is the maximum sustainable photon flux while avoiding polarization of the core material;
$\varepsilon_{czt}$=pair-creation energy in $Cd_{1-x}Zn_xTe$, where ($0 \leq x < 1$);
$\varepsilon_0$=electrical permittivity of free space;
V=bias voltage applied to the anode and cathode terminals;
q=1.6E-19 Coulombs;
L=detector thickness;
$\overline{E}_\gamma$=mean photon energy;
$\lambda$=photon absorption length scale defined by the linear photon absorption coefficient for $Cd_{1-x}Zn_xTe$, where ($0 \leq x < 1$);
$\beta = 1-\exp(-L/\lambda)$;
$\mu_h$=hole mobility;
$\tau_h$=trapping time for holes; and
$\tau_D$=temperature-dependent de-trapping time for holes $\tau_D \sim \exp(E_A/kT)$ 5. The method of claim 2 wherein the design maximum sustainable photon flux is more than 100 million counts/s/mm$^2$.

6. The method of claim 2 wherein:
the anode terminal, the cathode terminal or both comprise a plurality of segmented terminals.

7. A method of controlling a maximum sustainable photon flux that a photon counting detector with a core material of $Cd_{1-x}Zn_xTe$, where ($0 \leq x < 1$), is able to absorb in operation while avoiding polarization of the core material, including an anode terminal on one side of the core material and a cathode terminal on a side of the core material opposite the anode terminal, the steps comprising:
setting a value of a DC bias voltage applied between the anode terminal and the cathode terminal;
controlling a temperature of the core material in operation; and
controlling or selecting an energy output of a photon energy source to regulate a mean photon energy to be absorbed by the core material in operation.

8. The method of claim 7, wherein the following equation is utilized to determine the maximum sustainable photon flux of the core material in operation:

$$\Phi_\gamma^* = \frac{\varepsilon_{czt}\varepsilon_0 V^2}{qL\overline{E}_\gamma \lambda^2}\left[\beta - \frac{L}{\lambda}\exp\left(-\frac{L}{\lambda}\right)\right]^{-1} \frac{\mu_h \tau_h}{\tau_h + \tau_D};$$

where $\Phi_\gamma^*$ is the maximum sustainable photon flux while avoiding polarization of the core material;
$\varepsilon_{czt}$=pair-creation energy in $Cd_{1-x}Zn_xTe$, where ($0 \leq x < 1$);
$\varepsilon_0$=electrical permittivity of free space;
V=bias voltage applied to the anode and cathode terminals;
q=1.6E-19 Coulombs;
L=detector thickness;
$\overline{E}_\gamma$=mean photon energy;
$\lambda$=photon absorption length scale defined by the linear photon absorption coefficient for $Cd_{1-x}Zn_xTe$, where ($0 \leq x < 1$);
$\beta = 1-\exp(-L/\lambda)$;
$\mu_h$=hole mobility;
$\tau_h$=trapping time for holes; and
$\tau_D$=temperature-dependent de-trapping time for holes $\tau_D \sim \exp(E_A/kT)$ 9. The method of claim 7, wherein:
the anode terminal, the cathode terminal or both comprises a plurality of segmented terminals.

10. The method of claim 7, wherein the maximum sustainable photon flux is greater than 20 million counts/s/mm$^2$.

11. The method of claim 7, wherein the maximum sustainable photon flux is greater than 100 million counts/s/mm$^2$.

* * * * *